United States Patent [19]

Miyazaki

[11] Patent Number: 5,261,039
[45] Date of Patent: Nov. 9, 1993

[54] IMAGE FORMING APPARATUS CAPABLE OF INFORMING USER OF PROCESSING TIME NECESSARY BEFORE IMAGE RECORDING IS STARTED

[75] Inventor: Hideto Miyazaki, Yokohama, Japan

[73] Assignee: Ricoh Co., Ltd., Tokyo, Japan

[21] Appl. No.: 503,876

[22] Filed: Apr. 3, 1990

[30] Foreign Application Priority Data

Apr. 7, 1989 [JP] Japan ................................ 1-86729

[51] Int. Cl.⁵ ............................................ G06F 15/62
[52] U.S. Cl. ..................................... 395/144; 395/115; 395/101
[58] Field of Search ............... 395/145, 146, 113, 115, 395/116

[56] References Cited

U.S. PATENT DOCUMENTS

| 4,511,928 | 4/1985 | Colomb ........................... | 358/280 |
| 4,612,665 | 9/1986 | Inami et al. ...................... | 381/98 |

Primary Examiner—Gary V. Harkcom
Assistant Examiner—Joseph Feild
Attorney, Agent, or Firm—Cooper & Dunham

[57] ABSTRACT

An image forming apparatus has an operation part for specifying information to be recorded on a sheet, a recognition part for recognizing the information specified by the operation part, an input interface for receiving sequentially a first serial image data representing an image, a bit image generation part supplied with the first serial video data for forming bit images in response thereto, a memory having a memory area for storing the bit images formed by the bit image generation part in the memory area, a comparison part operatively connected on the one hand to the memory for reading out the bit images stored therein and on the other hand to the recognition part for receiving the information to be recorded on the sheet, the comparison part producing the output such that the output is changed with increasing occupation of the memory area by the bit images, and a reporting part connected to the comparison part for receiving the output from the comparison part and for displaying the proportion of the memory area of the memory which is already occupied by the bit images.

6 Claims, 5 Drawing Sheets

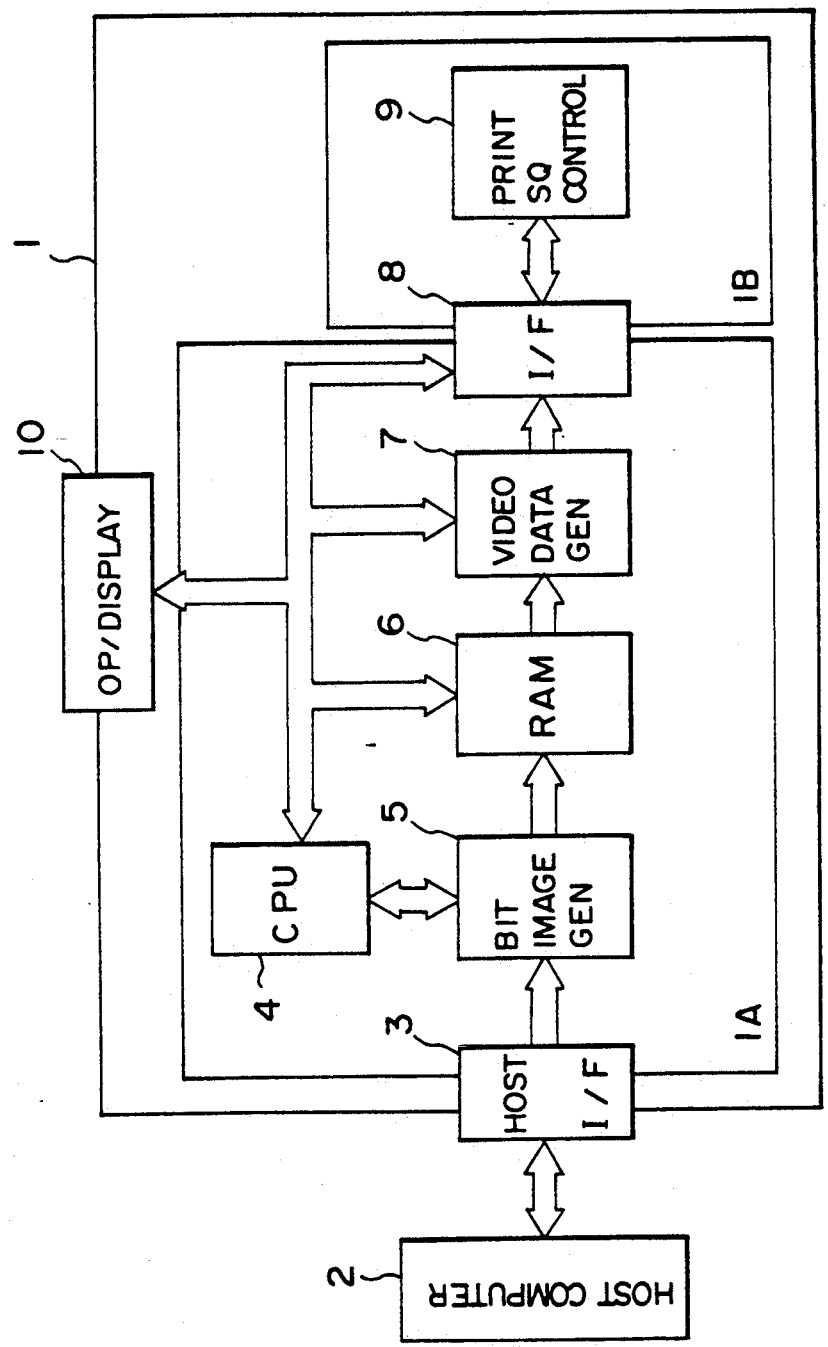

IMAGE FORMING APPARATUS CAPABLE OF INFORMING USER OF PROCESSING TIME NECESSARY BEFORE IMAGE RECORDING IS STARTED

BACKGROUND OF THE INVENTION

The present invention generally relates to forming of images and more particularly to an image forming apparatus wherein a sequential image data supplied thereto is expanded into a bit image and stored sequentially in a memory device, and wherein, when all the bit images are stored, the bit images are read out from the memory device for printing.

In an image forming apparatus of the type called a page printer or a laser printer, graphic images or large size letters can be printed on a sheet with high quality as a result of use of the page describe language. However, the process, performed by the page describe language, for calculating the coordinate of the bit images on the sheet involves a complex calculation and there is a problem that such an image forming apparatus requires a substantial time for such a processing.

FIGS. 1A and 1B show an example of the process performed using such a page describe language. According to this process, a curve image is represented by a so-called Bezier curve in which the shape and size of the curve image are determined by specifying the position of four points on the curve, two of which being at the end of the curve as represented by a point A and a point B, and the other two of which are control points C1 and C2 located on the tangentials of the curve image drawn at the respective ends of the curve image.

In the actual process, line segments connecting the point A and the point C1, the point C1 and the point C2, the point C2 and the point B, are calculated and the center of these line segments are obtained as mid-points AC1, C1C2 and C2B. Further, by connecting these mid-points AC1, C1C2 and C2B, an approximation of the original curve is obtained. By repeating the foregoing processes for a number of times, an increasingly improved approximation of the original image is obtained as illustrated in FIG. 1B.

The actual calculation is performed as follows. Assuming that a third order Bezier curve is used, the x- and y-coordinates of the points on the curve are represented, using a parameter t, ($0 < t < 1$) as follows:

$$x(t) = a_x t^3 + b_x t^2 + c_x t + x_0$$

$$y(t) = a_y t^3 + b_y t^2 + c_y t + y_0$$

where the parameter t is changed from 0 to 1, and the coefficients are defined as $$c_x = 3(x_0 - x_1), c_y = 3(y_1 - y_0)$$

$$b_x = 3(x_2 - 2x_1 + x_0)$$

$$b_y = 3(y_2 - 2y_1 + y_0)$$

$$a_x = x_3 - x_0 + 3(-x_2 + x_1)$$

$$a_y = y_3 - y_0 + 3(-y_2 + y_1)$$

in which $x_0$ and $y_0$ are the coordinates of the first end point A, $x_1$ and $y_1$ are the coordinates of the first control point C1, $x_2$ and $y_2$ are the coordinates of the second control point point C2, and $x_3$ and $y_3$ are the coordinates of the second end point B.

By changing the parameter t between zero and one with an identical interval, the approximation of the curve is obtained by the foregoing equation. Thereby, by increasing the number of divisions in the interval of the parameter t, the smoothness of the reproduced curve is improved. However, such an increase of the number of divisions inevitably invites increased number of calculations which in turn invites the increase of processing time.

When the foregoing process is applied to the image forming apparatus of the page printer type such as the laser printer, it will be understood that a considerable time is needed for the foregoing processing, and during the processing, the image forming apparatus cannot perform the printing. Thus, the user of the image forming apparatus has to wait before the apparatus starts printing until the foregoing processing is completed, without knowing when such a processing will end.

SUMMARY OF THE INVENTION

Accordingly, it is a general object of the present invention to provide a novel and useful image forming apparatus wherein the foregoing problems are eliminated.

Another object of the present invention is to provide an image forming apparatus for forming a given image on a sheet by expanding the image into a bit map, wherein the apparatus is capable of informing the user of the progress of processing for calculating the coordinate of the bit images so that the user can know how long he or she has to wait until such processing is completed and the formation of the image on the sheet is started.

Another object of the present invention is to provide an image forming apparatus for recording an image on a sheet line sequentially as a serial video data, comprising operation means for specifying the number of lines to be recorded on the sheet, recognition means for recognizing the number of lines specified by the operation means, bit image forming means supplied with the serial video data for forming bit images in response thereto, memory means for storing the bit images formed by the bit image forming means, comparison means for comparing the number of lines of the foregoing serial video data to be recorded on the sheet and the bit image stored in the memory means, calculation means for calculating the number of lines of the serial video data which is stored in the memory means on the basis of the bit images stored in the memory means, and reporting means for displaying the capacity of the memory means which is already used for storage of the bit images or the capacity of the memory means which is yet to be occupied by the bit images in order to complete one page image. According to the present invention, the user of the apparatus can monitor the progress of storage of the line sequential bit image in the memory means and thus can know how long he or she has to wait until the actual printing is started.

Other objects and further features of the present invention will become apparent from the following detailed description when read in conjunction with attached drawings.

BRIEF DESCRIPTION OF THE DRAWINGS

FIG. 2 is a block diagram showing a construction of a laser printer, particularly a print controller thereof, to which the image forming apparatus according to the present invention is applicable;

DETAILED DESCRIPTION

Figure 1A:
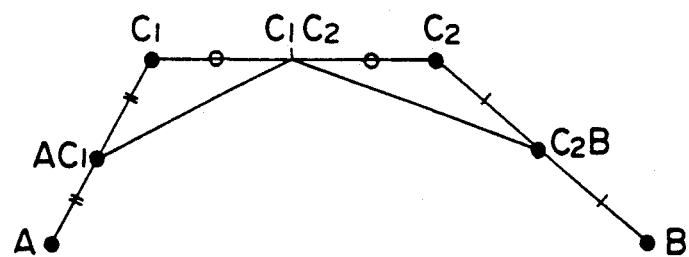
FIGS. 1A and 1B are diagrams showing a process for representing a curve image by a Bezier curve as is practiced conventionally in a prior art image forming apparatus.
Figure 1B:
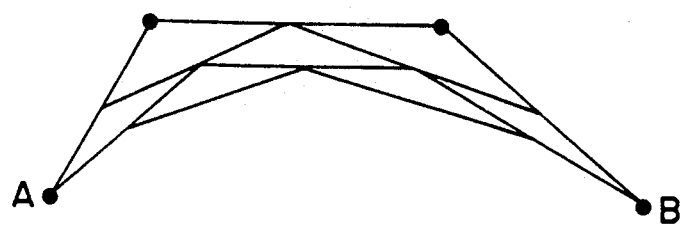

FIG. 2 shows a block diagram of a laser printer 1. This drawing shows in particular a print controller to which the present invention is applicable.

Referring to FIG. 2, a serial video data is sent from a host computer 2 to a print controller 1A of the laser printer 1 via an interface 3. In the print controller IA, the video data is processed, page by page, by a bit image generator 5 and thereby a bit image data is produced in response to the incoming serial video data under a control of a microcomputer (CPU) 4. This bit image data is then stored in an random access memory (RAM) 6.

The bit image data thus stored in the RAM 6 is then converted to a second serial video data corresponding to the bit image data by a video data generator 7, and this second serial video data is then supplied to a printer engine 1B via another interface 8. In the printer engine 1B, the serial video data is supplied to a print sequence controller 9, wherein a laser diode (not shown) for producing the image on a photosensitive drum (not shown) is controlled in accordance with the serial video data. Thereby, an image is transferred to a sheet from the photosensitive drum under a predetermined control. The laser printer 1 further includes an operation/display part 10 for manual setting of the laser printer as well as for informing of the status of the laser printer to the user.

Figure 3:
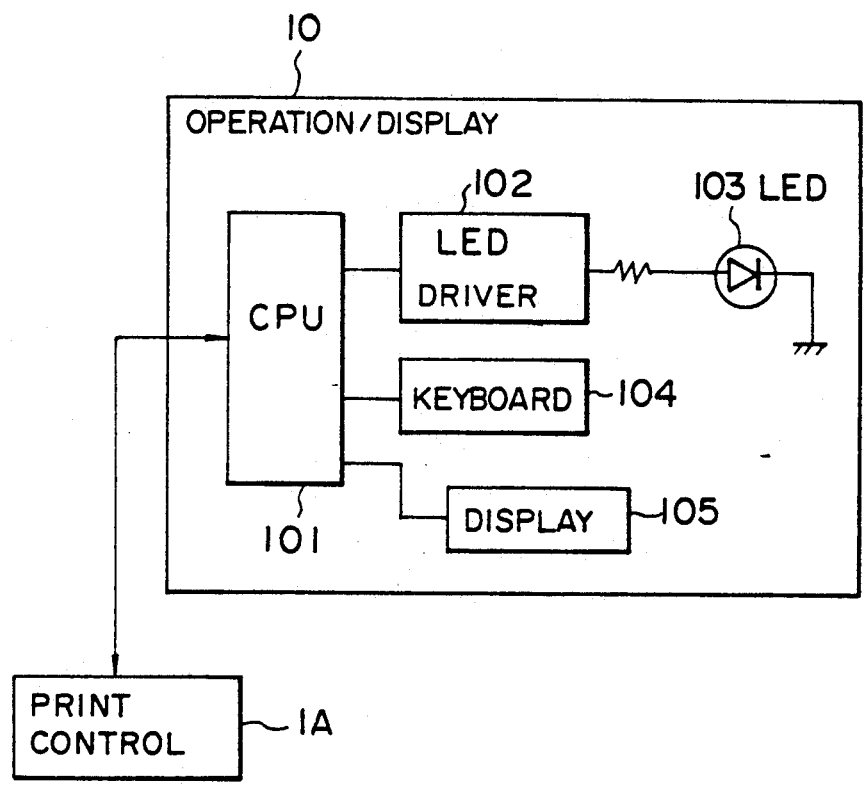
FIG. 3 is a block diagram showing an essential part of the image forming apparatus according to an embodiment of the present invention.

FIG. 3 is a block diagram showing an embodiment of the operation/display part 10 of the present invention. Referring to FIG. 3, the operation display part 10 includes a microcomputer 101 represented as CPU in the drawing which is connected to the printer controller IA. Further, the CPU 101 controls a display driver 102 for controlling a display device 103 which may be a light emitting diode (LED) as illustrated. Alternatively, other devices such as an audible alarm or beeper may be used as the display device 103.

The CPU 101 is further connected to a control panel or keyboard 104 which is used, as usual, for various setting of the operational mode of the laser printer 1. Further, there is a usual display part 105 for displaying the status of the laser printer 1. The keyboard 104 and the display part 105 are also used in the prior art image forming apparatus and thus have a known construction.

Figure 4:
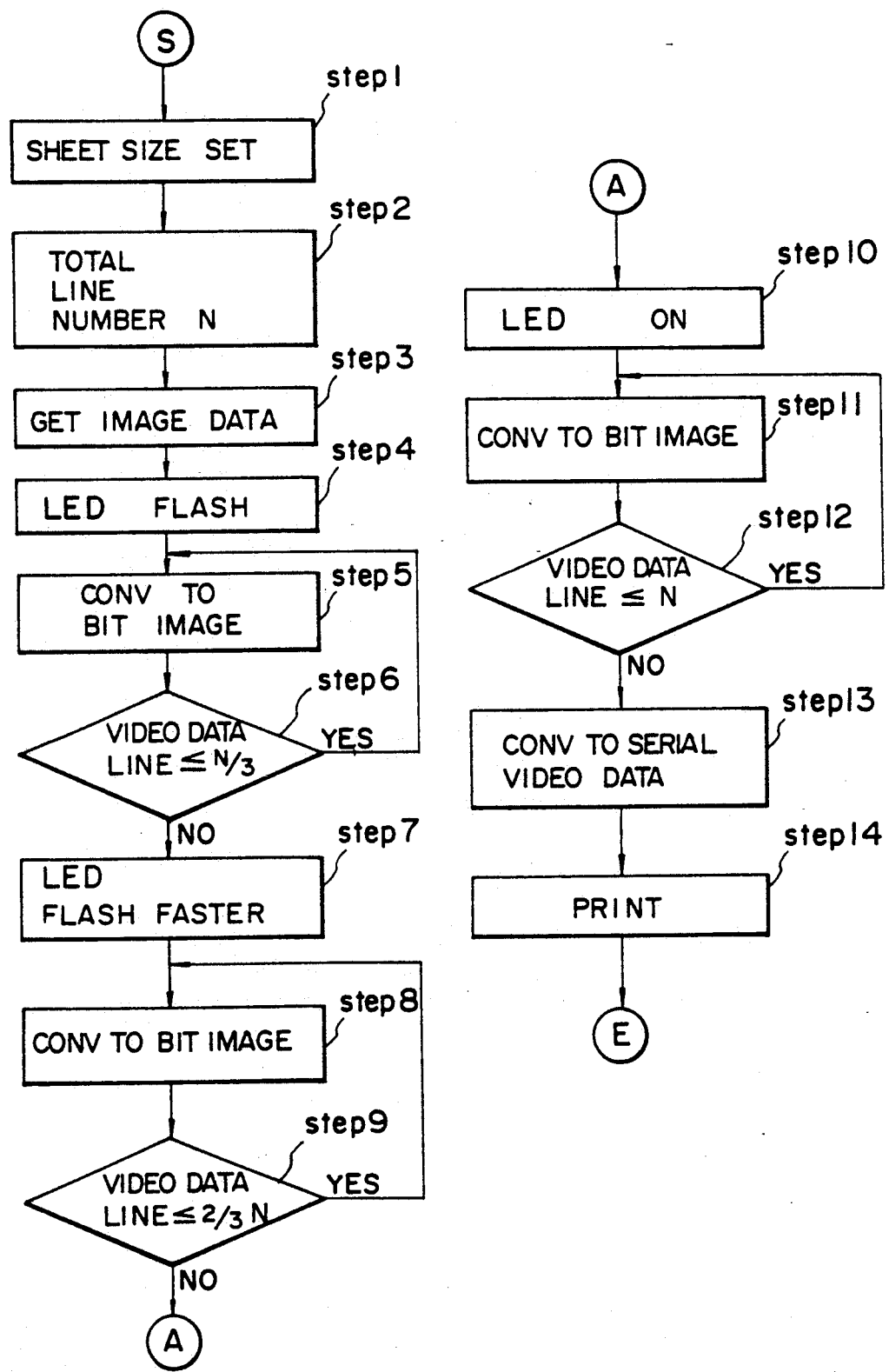
FIG. 4 is a flowchart showing the operation of the embodiment of the present invention.
Figure 5:
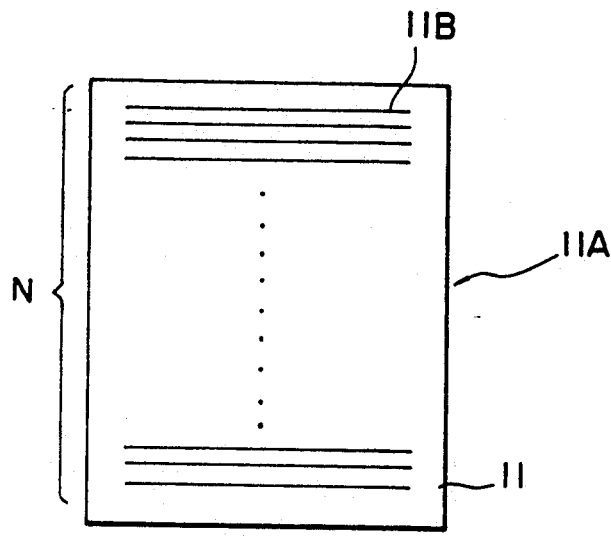
FIG. 5 is a diagram showing a image forming region defined on a sheet for recording the image.

Next, the operation of the image forming apparatus will be described with reference to FIG. 4 showing a flowchart of the operation, with further reference to FIG. 5 showing the definition of various parameters of the sheet.

In a step 1, the user specifies the size of the sheet on which the image is to be recorded by the manipulation of the keyboard 104. Referring to FIG. 5, the user specifies in this step various parameters of a sheet 11 such as a recording area 11A defined on the sheet 11, the number of lines N to be recorded on the recording area 11A in a form of video data lines 11b, and the like. In response to the foregoing setting in the step 1, the CPU 4 of the printer controller IA recognizes the number N in a step 2.

In a step 3, the CPU 4 reads the bit image data out from the RAM 6, and in a step 4, the CPU 101 drives the display driver 102 such that the LED 103 is repeatedly turned on and turned off with a predetermined, slow rate.

In a following step 5, the conversion of the serial video data to the bit image data by the bit image generator 5 and the storage of the bit image data in the RAM 6 are performed until it is discriminated in a step 6 by the CPU 4 that the number of lines of the serial video data stored in the RAM 6 in the form of the the bit image data has reached one-third (N/3) of the total number of lines of the serial video data for that page.

When it is detected that the number of lines has reached the foregoing value of N/3 in the step 6 by the CPU 4, the CPU 101 controls the display driver 102 such that the rate of turning-on and turning-off of the LED 103 is increased to a predetermined medium rate in a step 7, and the conversion of the serial video data to the bit image data by the bit image generator 5 and storage of the bit image data into the RAM 6 are continued until it is discriminated in a step 9 by the CPU 4 that the number of lines of the serial video data stored in the RAM 6 in the form of the bit image has reached two-thirds (2/3N) of the total number of lines N of the serial image data for that page.

In response to the detection of the number of lines reaching two-thirds of the total number of lines, the CPU 101 controls the display driver 102 in a step 10 such that the LED 103 is turned on continuously. Further, the conversion of the serial video data to the bit image by the bit image generator 5 is continued in a step 11 until it is detected in a step 12 that all the lines for that page are converted into the bit image and the storage into the RAM 6 is completed.

In response to the detection in the step 12, the bit image data stored in the RAM 6 is read out by the serial video data generator 7 in a step 13 and subsequently converted into the second serial video data representing the bit image.

This second serial video data is supplied to the printer engine IB via the interface 8 and the printing of the image on the sheet is performed in a step 14.

According to the foregoing process, the user can monitor the progress of the processing according to the rate of on and off of the LED 103 and thus can predict the time needed until the actual printing is started. The device for indicating the progress of the processing is of course not limited to LED 103 but other suitable means such as an audible alarm may also be employed. Further, the changing of the rate of on and off of the LED is not necessarily be made in three distinct phases as is disclosed but may be made in four or more phases. Further, the change of the rate may be made in only two distinct phases.

Figure 6:
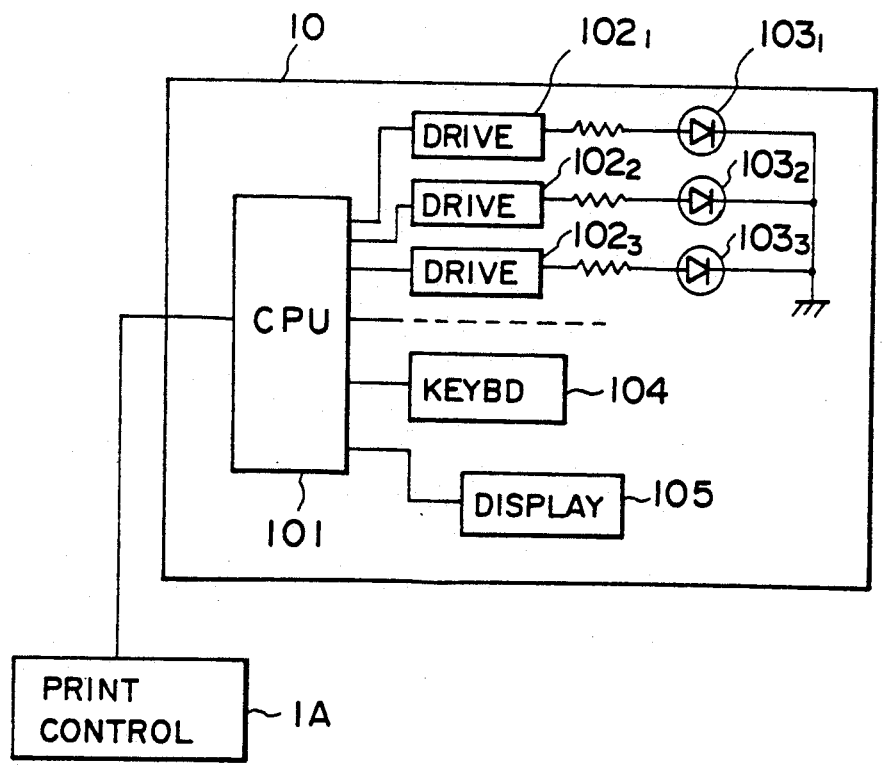
FIG. 6 is a partly block and partly circuit diagram showing an alternative embodiment for carrying out certain steps shown in FIG. 4.

Alternatively, the discrimination step such as the steps 6, 9 and 12 for detecting the number of lines of the serial video data stored in the RAM 6 may be replaced by corresponding steps 6', 9', 12' and the like for detecting the memory field of the RAM 6 which is occupied by the bit image data. Referring to FIG. 6 showing this embodiment, there are a number of display drivers $102_1$-$102_n$ and corresponding LEDs $103_1$-$103_n$ connected to the CPU 101, and the memory field of the RAM 6 is divided into a number of distinct areas each having an identical memory capacity in correspondence to the display drivers $102_1$-$102_n$.

The CPU 4 is used to detect the memory area currently used in the RAM 6 for storing the bit image data. Thus, in the step 6', the CPU 4 detects whether the bit image data is stored currently in a first memory area of the RAM 6 or not, and if YES, the CPU 4 sends a control signal to the CPU 101 such that the first LED $101_1$ is turned on via the first display driver $102_1$. Similarly, when the CPU 4 detects in the step 9' that the bit image data is stored currently in a second memory area of the RAM 6, the CPU 4 sends a control signal indicative thereof to the CPU 101 and the CPU 11 in response turns on the LED $103_2$ via a second display driver $102_2$, in addition to the LED $103_1$. Similarly when the CPU 4 detects in the step 12' that the bit image data is stored currently in a third memory area of the RAM6, the CPU 4 sends a control signal indicative thereof to the CPU 101, and thereby the CPU 11 turns the LED $103_3$ on in response thereto.

According to this embodiment, the progress of the processing is represented by the number of energized LEDs which represents the memory area occupied by the bit image data. In contrast to the first embodiment, the state of the LEDs $103_1$-$103_n$ is stationary and not turned on and off.

Further, when the LED 103 of the first embodiment is replaced by an audible alarm device such as a beeper, the user can know the progress of the processing even when he or she is not immediately beside the apparatus. The modification for using beeper in place of the LED is obvious and further description thereof will be omitted.

Further, the present invention is not limited to these embodiments but various variations and modifications may be made without departing from the scope of the invention.

What is claimed is:

1. An image forming apparatus for recording an image onto a sheet, comprising:
    operation means for specifying information to be recorded onto a sheet;
    recognition means connected to the operation means for recognizing the information specified by the operation means;
    an input interface having an input port for receiving first serial image data representing an image;
    bit image generation means for forming bit images in response to said first serial image data;
    memory means, connected to the bit image generation means, for storing the bit images in a memory area thereof;
    comparison means, connected to the memory means for reading out the bit images stored in the memory means and to the recognition means for receiving the information to be recorded onto the sheet, said comparison means comparing said information with the bit images read out from the memory means and producing an output indicating the proportion of the memory area which is occupied by the bit images, said comparison means producing the output such that the output is changed with increasing occupation of the memory area by the bit images;
    reporting means connected to the comparison means for receiving and displaying the output from the comparison means the proportion of the memory area of the memory means which is occupied by the bit images;
    bit image reading means connected to the memory means for reading the bit image data therefrom when a predetermined amount of the bit images corresponding to the information to be recorded on the sheet is stored in the memory area, said bit image reading means producing second serial image data; and
    a printer apparatus supplied with the second serial image data for recording the image onto the sheet sequentially in the form of lines of data.

2. An image forming apparatus as claimed in claim 1 in which said operation means specifies the number of lines in the information to be recorded onto the sheet, and said comparison means produces the indicating the proportion of the memory area which is occupied by the bit images output such that the output represents a proportion of the lines of the second serial image data corresponding to the bit images stored in the memory means with respect to the total number of lines to be recorded onto the sheet.

3. An image forming apparatus as claimed in claim 1 in which said reporting means comprises a microprocessor and a display device controlled by the microprocessor, said microprocessor being connected to the comparison means and controlling the display device such that the display device has a state which is changed in response to the output of the comparison means.

4. An image forming apparatus as claimed in claim 3 in which said microprocessor controls the display device in response to the output of the comparison means such that the state of the display device is one of a plurality of distinct states corresponding to the output of the comparison means.

5. An image forming apparatus as claimed in claim 4 in which said display device comprises a light emitting device, and said microprocessor controls the light emitting device such that the light emitting device is turned on and turned off repeatedly with a predetermined rate of repetition, and wherein said microprocessor controls the rate of repetition such that the rate is changed to be one of a plurality of distinct rates in response to the continuous change in the output of the comparison means.

6. An image forming apparatus as claimed in claim 5 in which said display device comprises a plurality of light emitting devices controlled by the microprocessor such that the number of the light emitting devices which are turned on is changed in response to the output of the comparison means.

* * * * *